(No Model.)
S. M. BRADEN.
STEAMING ATTACHMENT FOR WHEAT HEATERS.
No. 478,151. Patented July 5, 1892.
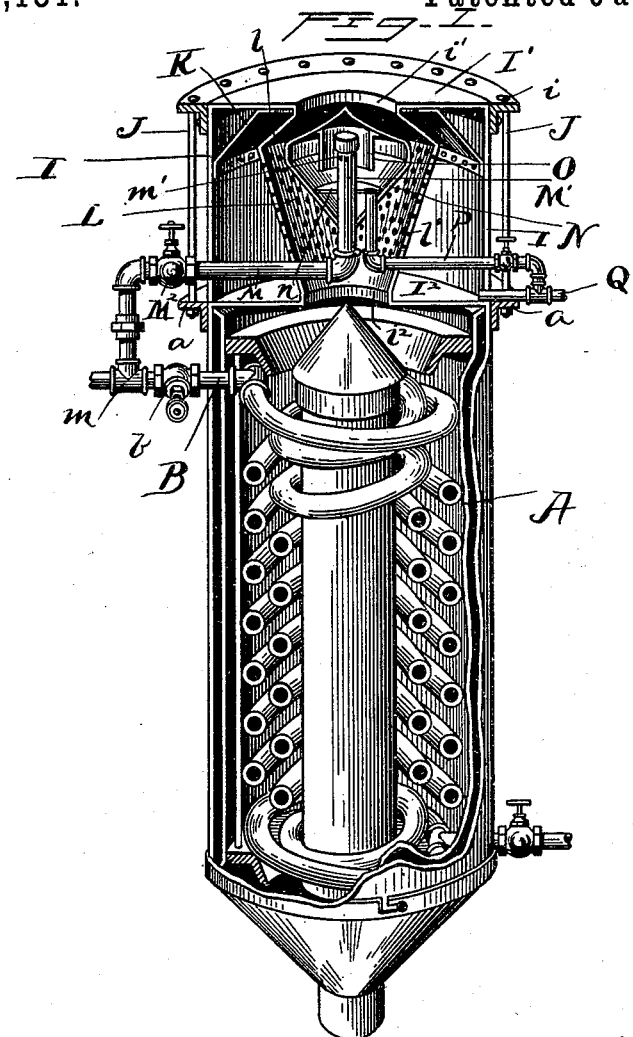
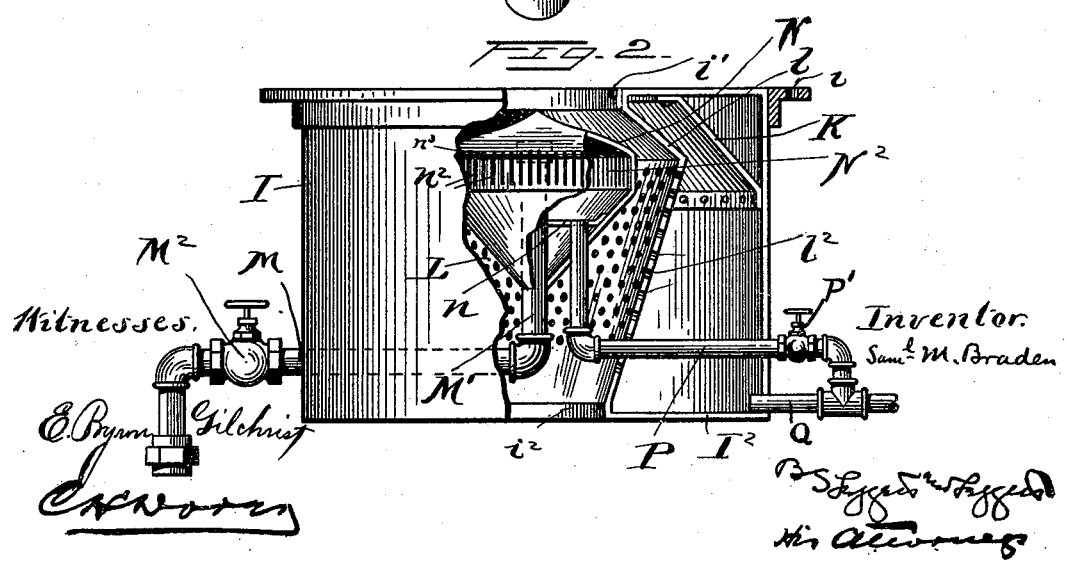

United States Patent Office.

SAMUEL M. BRADEN, OF LIGONIER, INDIANA.

STEAMING ATTACHMENT FOR WHEAT-HEATERS.

SPECIFICATION forming part of Letters Patent No. 478,151, dated July 5, 1892.

Application filed December 26, 1891. Serial No. 416,117. (No model.)

*To all whom it may concern:*

Be it known that I, SAMUEL M. BRADEN, of Ligonier, in the county of Noble and State of Indiana, have invented certain new and useful Improvements in Steaming Attachments for Wheat-Heaters; and I do hereby declare the following to be a full, clear, and exact description of the invention, such as will enable others skilled in the art to which it pertains to make and use the same.

My invention relates to steaming attachments for wheat-heaters.

The importance of steaming wheat before its entrance into the heater, especially wheat that is very dry and hard, is well known; but the devices heretofore devised for this purpose were objectionable, in that there was no suitable provision for adequately draining the wheat of superfluous moisture before its entrance into the heater and the heating-chamber of the heater was liable to become clogged, materially interfering with the performance of the functions of the heater.

The object of the invention is, therefore, to overcome the objectionable feature of the devices just alluded to; and with this object in view my invention consists in certain features of construction and in combination of parts hereinafter described, and pointed out in the claim.

In the accompanying drawings, Figure 1 is a central vertical section in perspective illustrating the application of my improved steaming attachment to wheat-heaters. Fig. 2 is an elevation, partly in section, of the steaming attachment detached.

My improved steaming attachment may be applied to almost any of the wheat-heaters in the market, although I have chosen to illustrate its application to a heater substantially like that disclosed in Letters Patent of the United States No. 217,923, granted to me July 29, 1879, and hence it is not considered necessary to give a detailed description of the heater further than to state that A represents the heater, B the steam supply-pipe, and $b$ a valve or cock for regulating the supply of steam to the heater. In case the steaming attachment is provided with a bottom head the heater of course need not have an upper head, or if the heater is provided with an upper head the steaming attachment need not have a bottom head. I, however, prefer the construction of steaming attachment shown, the same comprising a hollow cylinder I, that is preferably of the same diameter as the outer casing of the heater, and is provided with heads top and bottom, as at I' I$^2$, the heads having central openings $i'$ $i^2$, respectively, for the induction and eduction of the grain. At the upper end heater A has an external lateral circumferential flange $a$, and the steaming attachment has at the upper end a corresponding circumferential flange $i$, bolts J connecting the respective flanges and rigidly securing the steaming attachment to the heater. The top head of cylinder I is preferably braced in any suitable manner—for instance, as shown, by means of rods K, secured to the top and surrounding wall of cylinder I. Within the chamber of cylinder I is located a central chamber L, that is in open relation with induction and eduction openings $i'$ $i^2$, the upper portion of the surrounding wall of the chamber flaring inward some little distance, as at $l$; but thence to the eduction-opening the surrounding wall of chamber L is of an inverted-frusto-conical form, as at $l'$, and full of fine perforations $l^2$.

M represents a steam-pipe that is connected, preferably, with steam-pipe B of the heater by means of a T $m$ and thence leads, as shown, into chamber L and extends upwardly inside a steaming-head N, the latter being centrally located within chamber L. Steam-pipe M, outside the steaming attachment, is provided with a valve or cock M$^2$ for controlling the supply of steam to the steaming-head, steam-pipe M' being closed at the upper end and provided with an annular series of lateral jet-orifices $m'$. The steaming-head has a conical top N' and a central annular or cylindrical portion N$^2$, the remainder of the steaming-head from the annular or cylindrical portion downward to the bottom $n$ of the steaming-head being of an inverted-frusto-conical form. Steaming-head N may be supported in any suitable manner—for instance, by clamping same to the upright section M' of the steam-pipe M. The cylindrical portion of the steam-head has an annular series of vertical slits or elongated perforations $n^2$, that are adapted to discharge the live steam from the steam-pipe into chamber L; but to prevent the jets of steam issuing from the lateral orifices or perforations $m'$ in the steam-pipe from throwing or projecting condensed steam into chamber L suitable provision is had, such as an annular hood O, suspended from the top of the steaming-head, where it is secured in any suitable manner. By means of such provision there is no possibility of condensed steam being thrown or ejected into chamber L, as aforesaid. The bottom of steaming-head N has also an opening for receiving the end of a drain-pipe P, that leads thence and discharges outside the steaming attachment. The chamber of cylinder I at the bottom is also in open communication with a drain-pipe Q, that also leads and discharges outside the steaming attachment, drain-pipe P being provided with a valve or cock P' and discharging, preferably, into drain-pipe Q outside the steaming attachment.

The operation of my improved steaming attachment is as follows: The wheat, steamed previous to its entrance into the heater, is introduced at the induction-opening $i'$ and by means of the conical top of the steaming-head is spread and distributed to the surrounding chamber, coming in contact with and moistened or dampened by the steam as it issues from slits or elongated perforations $n^2$ of the steaming-head, and by means of the peculiar form and location and ample diametric dimensions of the steaming-head the grain is directed against the perforated inverted-frusto-conical wall of chamber L and travels adown said wall into the heater below; but by means of the perforations in said wall the grain will be adequately drained of all superfluous moisture before its discharge at eduction-opening $i^2$, the superfluous moisture being discharged into the outer chamber of cylinder I, and hence it will be observed that the objectionable feature of the steaming attachments heretofore devised, referred to in the preamble of this specification, is entirely avoided. Perforations $n^2$ in the steaming-head N are preferably extended more or less into the conical top of the steaming-head, as shown at $n^3$, so that the wheat will come in contact with steam before leaving the conical top of the steaming-head.

What I claim is—

In a steaming attachment for wheat-heaters, the combination, with outer and inner chambers separated by a perforated inverted-frusto-conical wall, the inner chamber being in open relation with the induction and eduction openings at the steaming attachment, of a steaming-head located within the inner chamber, said steaming-head having a conical top and having an annular series of slits or perforations below such conical top, a steam-pipe for supplying steam to the steaming-head, a hood for preventing the ejection of condensed steam from the annular series of slits or perforations in the steaming-head aforesaid, and drain-pipes for conducting off the water resulting from condensation of steam or otherwise, substantially as and for the purpose set forth.

In testimony whereof I sign this specification, in the presence of two witnesses, this 17th day of October, 1891.

SAMUEL M. BRADEN.

Witnesses:
GEORGE McLEAN,
JOHN WEIR.